United States Patent [19]

Min

[11] Patent Number: 5,398,260
[45] Date of Patent: Mar. 14, 1995

[54] METHOD AND APPARATUS FOR RESTORING MULTI LEVEL/PHASE MODULATION DATA

[75] Inventor: Byong M. Min, Seoul, Rep. of Korea
[73] Assignee: Samsung Electronics Co., Ltd., Kyungki-Do, Rep. of Korea
[21] Appl. No.: 228,501
[22] Filed: Apr. 15, 1994
[51] Int. Cl.6 .................. H04L 25/49; H04L 27/06
[52] U.S. Cl. ................... 375/286; 375/341; 375/354; 371/43
[58] Field of Search ............ 375/17, 20, 39, 94, 375/118, 106, 78, 80, 83; 332/304; 371/43

[56] References Cited

U.S. PATENT DOCUMENTS 5,243,627 9/1993 Betts et al. ............... 375/39
5,301,209 4/1994 Wei .......................... 375/39

Primary Examiner—Stephen Chin
Assistant Examiner—Tesfaldet Bocure
Attorney, Agent, or Firm—Sughrue, Mion, Zinn, Macpeak & Seas

[57] ABSTRACT

A method and apparatus for receiving multi level/phase modulation data and restoring the received data to its original data state. The received data is demodulated and deinterleaved. The deinterleaved data is decoded in a Trellis decoder. Here, when the data to be deinterleaved is not synchronized, the deinterleaving sync is shifted, the deinterleaving operation is again repeated, thereby correcting ±180° phase error. The multi level/phase decoder includes an axis exchanger for exchanging the I-axis data and the Q-axis with each other. Accordingly, when the sync is not matched even though the sync is shifted by one cycle in the deinterleaver, the axis exchange is performed in the axis exchanger. Then, the axis-exchanges data is deinterleaved and Trellis-decoded, to thereby correct ±90° phase error.

10 Claims, 2 Drawing Sheets

METHOD AND APPARATUS FOR RESTORING MULTI LEVEL/PHASE MODULATION DATA

BACKGROUND OF THE INVENTION

The present invention relates to a system for restoring multi level/phase modulation data for use in a digital transmission system, and more particularly, to a method and apparatus for restoring multi level/phase modulation data to further improve reliability of data reconstruction by correcting a phase error which is produced in demodulation data.

Optimally, a transmission system should transmit at a predetermined transmission velocity with good reliability even if the transmission channel is in poor condition. This reliability is provided by using an error correcting coding/decoding method, such as a Trellis coded modulation (hereinafter, abbreviated as TCM) method. The TCM method combines data modulation with an error correction codification and improves the coding gain as the bandwidth of the transmission data is increased. Since the TCM technology is already known in the digital communication field, a detailed description thereof will be omitted. To improve the data transmission capability, an interleaving and deinterleaving method is also used in the digital transmission system.

FIG. 1 shows an example of a conventional apparatus for restoring multi level/phase modulation data. FIG. 1 shows a circuit for receiving data transmitted thereto. The data is assumed to have been interleaved, RS coded and Trellis coded, modulated and transmitted to a receiver. At the receiver the received data is demodulated and restored to its original data form.

In FIG. 1, I-axis data, which is in-phase data demodulated in a demodulator (not shown), and Q-axis data, which is quadrature-phase data demodulated in a demodulator (not shown), are input to input ports 11 and 12, respectively. Since the respective I-axis and Q-axis data have been interleaved, a deinterleaver 13 deinterleaves the respective I-axis and Q-axis data based on a predetermined sync position and outputs the deinterleaved data. The I-axis and Q-axis data appearing at the output of deinterleaver 13 is Trellis-decoded in a Trellis decoder 14. The Trellis decoder 14 determines whether or not the Trellis-decoded data is synchronized. A Viterbi algorithm is used for such a sync determination. The Trellis decoder 14 repetitively performs a process of selecting a path where the Hamming distance is shortest among paths of the data inputted to the respective state in a Trellis diagram, to find a path having the minimum Hamming distance entirely. If the cumulative distance of the found path is larger than a predetermined reference value, Trellis decoder 14 determines that the sync does not match and generates a predetermined out-of-sync signal $S_1$. The predetermined reference value is determined by a designer and is experimentally obtained. Out-of-sync signal $S_1$ at the output of Trellis decoder 14 is supplied to a first sync detector 15. First sync detector 15 generates a predetermined control signal $S_2$, which is supplied to deinterleaver 13 whenever out-of-sync signal $S_1$ is generated. Control signal $S_2$ causes adjustment of the sync position for the deinterleaving operation of deinterleaver 13. Deinterleaver 13 slides the sync position whenever the sync adjustment control signal $S_2$ is applied thereto, and performs a deinterleaving operation at the slide sync position. The data deinterleaved according to the slid sync position is again supplied to Trellis decoder 14. Trellis decoder 14 Trellis-decodes the input data again and once again determines if the sync is matched. Trellis decoder 14 finds a sync from the input data by repetitively performing such a set of sync detection processes.

If a sync condition is detected, the data decoded in Trellis decoder 14 is supplied to a block deinterleaver 16. Block deinterleaver 16 again deinterleaves, in units of a block, the data which has been interleaved in units of a block in a modulator at the transmission end. A second sync detector 17 detects a sync condition of the block data which is deinterleaved in block deinterleaver 16. Second sync detector 17 is disabled by out-of-sync signal $S_1$ from Trellis decoder 14. The block data appearing at the output of block deinterleaver 16 is supplied to a Reed Solomon (RS) decoder 18. RS decoder 18 RS-decodes the data which has been RS-coded at the transmission end to reinforce an error correction function of the transmission data. Here, RS decoder 18 decodes the block data while matching a block sync signal $S_3$ which is supplied from second sync detector 17.

Such a conventional restoring apparatus for multi level/phase modulation data does not restore exactly the original information data when a phase error occurs in the demodulated I- and Q-channel data.

To solve the problem of a phase error, a differential encoding/decoding method is currently used. The differential encoding method does not transmit data corresponding to the absolute value of the phase, but transmits only data corresponding to phase difference. The differential encoding/decoding method will be described below, with reference to 32-tuple quadrature amplitude modulation (QAM) data, which is Trellis-coded according to constellation of FIG. 2.

A codeword used in the 32-tuple QAM data, which is Trellis-encoded according to the FIG. 2 constellation, is a 5-bit $(Y_4Y_3Y_2Y_1Y_0)$ data codeword. Of these bits, the upper three bits $(Y_4Y_3Y_2)$ are uncoded bits, and the lower two bits $(Y_1Y_0)$ are coded bits. Also, at the 32-tuple QAM data, uncoded bits $(Y_4Y_3Y_2)$ are mapped so as to be 90° rotationally invariant, and the coded bits $(Y_1Y_0)$ are mapped so as to have complimentary relationship at a time of 180° rotation. For example, in case of a codeword "A" of FIG. 2, the value of the uncoded bits "100" corresponds to an identical bit value "100" with respect to ±90° rotation, while the value of the codeword bits "01" corresponds to a bit value "10" with respect to ±180° rotation; the bit values having a complementary relationship with each other. Thus, when a phase error of ±180° is generated in the Trellis coded 32-tuple QAM data as described above, such an error can be easily detectd.

However, such a differential coding/decoding method cannot find sync data in a demodulator when a phase error of ±90° is generated. Accordingly, correct decoding cannot be performed.

SUMMARY OF THE INVENTION

Therefore, to solve the above problems, it is an object of the present invention to provide a method and an apparatus for restoring multi level/phase modulation data and to improve the reliability of the restored data by effectively solving various phase errors which are generated in the multi level/phase modulated data.

To accomplish the above object of the present invention, there is provided a method for receiving multi level/phase modulation data and restoring the multi level/phase modulation data into original data, the method comprising the steps of:

receiving I-axis data and Q-axis data which is obtained by demodulating the received multi level/phase modulation data; deinterleaving the I-axis data and the Q-axis data; Viterbi-decoding the deinterleaved data and discriminating if the Viterbi-decoded data is synchronized; shifting a data deinterleaving sync position at the deinterleaving step by a predetermined interval when the Viterbi-decoded data is not synchronized; and exchanging the I-axis data and the Q-axis data with each other when a sync is not matched although it is repetitively discriminated if the sync is matched while a sync position at the deinterleaving sync shifting step is shifted in turn for one cycle.

Another object of the present invention can be accomplished by providing an apparatus for receiving multi level/phase modulation data and restoring the multi level/phase modulation data into original data, the apparatus comprising:

input ports for receiving I-axis data and Q-axis data which is obtained by demodulating the received multi level/phase modulation data, respectively; an axis exchanger portion for receiving the I-axis data, the Q-axis data and a predetermined control signal and selectively exchanging the axes of the I-axis data and the Q-axis data according to the control signal; a deinterleaver for deinterleaving the I-axis data and the Q-axis data which is outputted from the axis exchanger, respectively; a Viterbi-decoding portion for decoding the deinterleaved data according to a Viterbi algorithm and outputting a predetermined out-of-sync signal when it is discriminated that the Viterbi-decoded data is synchronized as a result; and a sync detecting portion for detecting the out-of-sync signal outputted from the Viterbi-decoding portion to supply a sync adjustment control signal for shifting a data deinterleaving sync position to the deinterleaver and to supply the control signal for controlling axis exchange in the axis exchanger.

DETAILED DESCRIPTION OF THE PREFERRED EMBODIMENT

A preferred embodiment of the present invention will be described below in more detail with reference to the accompanying drawings.

Figure 3:
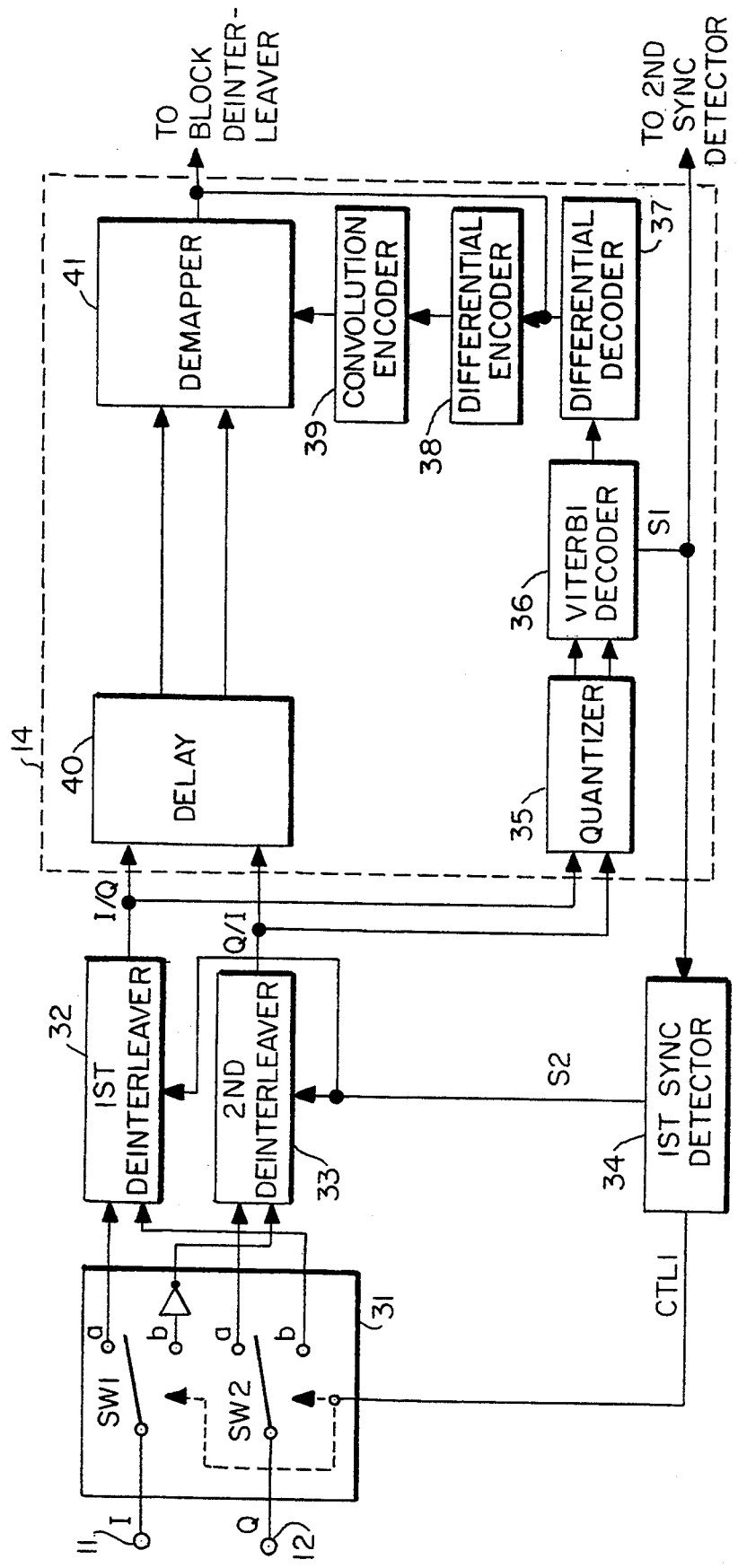
FIG. 3 is a block diagram showing an apparatus for restoring multi level/phase modulation data according to a preferred embodiment of the present invention.

In FIG. 3, which shows an apparatus for restoring multi level/phase modulation data according to a preferred embodiment of the present invention, I-axis data and Q-axis data is applied to the FIG. 3 apparatus through two input ports 11 and 12, respectively. The I-axis data and Q-axis data are supplied to an axis exchanger portion 31. Axis exchanger portion 31 includes two switches SW1 and SW2, which are switched according to a predetermined control signal CTL1. The two switches SW1 and SW2 perform switching operations for exchanging phase axes of the I-axis and Q-axis data in accordance with the control signal CTL1. The phase axis exchanging operation will be described in detail subsequently.

A first deinterleaver 32 and a second deinterleaver 33 deinterleave the data which is applied thereto from the first switch SW1 and second switch SW2 of axis exchanger portion 31. First deinterleaver 32 and second deinterleaver 33 deinterleave the data of the axis which is selected by axis exchanger portion 31, respectively. The I-axis signal which is applied to first deinterleaver 32 is not applied to second deinterleaver 33, and the Q-axis signal which is applied to first deinterleaver 32 is not applied to second deinterleaver 33, and the Q-axis signal which is applied to first deinterleaver 32 is not applied to second deinterleaver 33. The data respectively deinterleaved in first and second deinterleavers 32 and 33 is supplied to a Trellis decoder 14.

Trellis decoder 14 includes a quantizer 35, a Viterbi decoder 36, a differential decoder 37, a differential encoder 38, a convolution encoder 39, a delay 40 for delaying input data for a predetermined time of interval and demapper 41. Quantizer 35 transforms the input I-axis and Q-axis data into a Viterbi coded quadrature phase shift keying format, and outputs the transformed data. That is, the data of a TCM format which appears at the output of the first and second deinterleavers 32 and 33 is quantized as data having a phase of the decodable format in Viterbi decoder 36. Viterbi decoder 36 decodes the quantized symbols supplied from quantizer 35 according to the Viterbi algorithm. At the same time, a predetermined out-of-sync signal $S_1$ based on cumulative distance of the symbols is provided as an output of Viterbi decoder 36. Particularly, when the cumulative distance of the symbols is larger than a predetermined reference value, Viterbi decoder 36 outputs a predetermined out-of-sync signal $S_1$. The out-of-sync signal $S_1$ from Viterbi decoder 36 is supplied to a sync detector 34. Then, sync detector 34 generates a predetermined sync adjustment control signal $S_2$ and supplies the sync adjustment control signal $S_2$ to first and second deinterleavers 32 and 33, respectively. When first and second deinterleavers 32 and 33 receive sync adjustment signal $S_2$, a deinterleaving sync position is shifted by a predetermined interval, to deinterleave the input data according to the shifted sync position. Sync adjustment control signal $S_2$ is generated based on the detected out-of-sync signal $S_1$. Accordingly, if a series of processes which shift the deinterleaving sync position is repetitively performed, Viterbi decoder 36 receives the deinterleaved data according to the matched sync from deinterleavers 32 and 33, Viterbi-decodes the received data, and outputs the Viterbi-decoded data.

Figure 2:
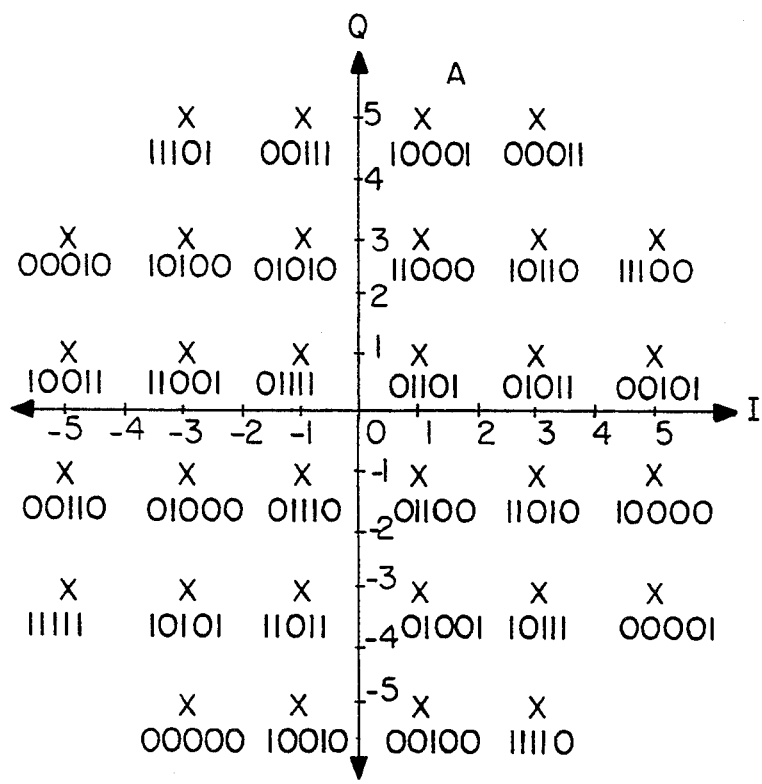
FIG. 2 is a view showing constellation of a general multi level/phase modulation data.

A differential decoder 37 differentially decodes the output data from Viterbi-decoder 36 and outputs the differentially decoded data. For example, when the differentially decoded data is composed of a codeword having three uncoded bits $Y_4Y_3Y_2$ and two coded bits $Y_1Y_0$ as shown in FIG. 2. Differential decoder 37 outputs the data having two-bit length which is obtained by decoding the encoded bits, together with the uncoded bits which are not decoded. The output data from differential decoder 37 is again differentially encoded in differential encoder 38. As a result, the coded data obtained in differential encoder 36 becomes data of the same format as the differentially encoded data at the transmission end. Convolution encoder 39 convolution-encodes the data supplied from differential encoder 38 and outputs the convolution-encoded data. The reason why the differentially encoded data is encoded in differential encoder 38 and convolution encoder 39 is for changing the output data from differential decoder 37 into a data format which can be processed in demapper 41.

Figure 1:
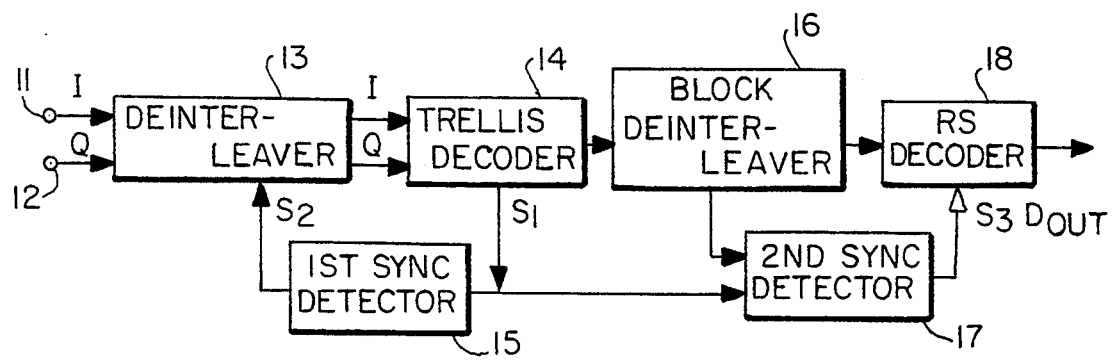
FIG. 1 is a block diagram showing an example of a conventional apparatus for restoring multi level/phase modulation data.

On the other hand, the I-axis data and the Q-axis data appearing at the outputs of first and second deinterleavers 32 and 33 is delayed for a predetermined time interval in delay 40, and the delayed data is applied to demapper 41. The demapper 41 receives the output data of delay 40 and the output data of convolution encoder 39 and determines the data corresponding to the uncoded bits of the codeword based on the output data of convolution encoder 39 to output the determined data. The uncoded bit and the encoded bits appearing at the output of differential decoder 37 constitutes a decoded codeword, which is supplied to block deinterleaver 16 of FIG. 1.

However, if the phase error is ±90° Viterbi decoder 36 cannot detect a sync. Accordingly, out-of-sync signal $S_1$ is continuously generated. First and second deinterleavers 32 and 33, which receive out-of-sync signal $S_1$, would continuously shift the deinterleaving sync position in response thereto. Accordingly, if a sync condition remains undetected, the system can enter an operation state corresponding to an infinite loop.

Thus, to solve the problem caused by a ±90° phase error, sync detector 34 includes a counter (not shown) having a value of a predetermined modulo-N to count out-of-sync signal $S_1$ supplied from Viterbi decoder 36. The value of the modulo-N in the counter is the same as the number of times which the respective interleavers shift the sync position according to sync adjustment control signal $S_2$ within an interval from the sync data of the data inputted in first and second deinterleavers 32 and 33 to the next sync data. The latter interval is considered one cycle. Thus, the sync position is repetitively shifted for one cycle, to thereby enable sync detector 34 to generate a predetermined control signal CTL1. Then, axis exchanger 31 receives control signal CTL1 and controls first and second switches SW1 and SW2, respectively. Thus, the input terminals of first and second switches SW1 and SW2 are connected to the output terminals "b" according to control signal CTL1, respectively. As a result, axis exchanger 31 exchanges the I-axis and the Q-axis with each other. That is, the I-axis data applied through input port 11 is converted into the Q-axis data by passing through first switch SW1, so as to be supplied to second deinterleaver 33. The Q-axis data applied through other input port 12 is converted into the I-axis data by passing through second switch SW2, so as to be supplied to first deinterleaver 32. Here, an inverter which is connected to a terminal "b" of first switch SW1 is used during the axis exchange, that is, for converting the values on the I-axis and the Q-axis of the data constellation which is generated during the ±90° phase conversion. For example, when a point "A" in FIG. 2 is phase-converted by −90° in a counterclockwise direction, the coordinate values of the I-axis and the Q-axis is changed from a value of (1,5) to a value of (−5,1). The axis-exchanged data is deinterleaved in first and second deinterleavers 32 and 33, respectively. As described above, the sync is found in Viterbi decoder 36.

As described above, the system for restoring the multi level/phase modulation data according to the present invention shifts the deinterleaving sync by a predetermined interval repetitively until the data deinterleaved in the deinterleaver is synchronized, to perform a deinterleaving operation. Also, the restoring system according to the present invention judges that ±90° phase error is generated when a sync is shifted by one cycle, and exchanges the I-axis with the Q-axis of the input data to again perform a deinterleaving and restoring processes. Thus, ±90° phase error as well as ±180° phase error generated in the input data is adaptively corrected, thereby further improving reliability of the restored data.

What is claimed is:

1. A method for receiving multi level/phase modulation data and restoring the multi level/phase modulation data into original data, said method comprising the steps of:

receiving I-axis data and Q-axis data which is obtained by demodulating the received multi level/phase modulation data;

deinterleaving the I-axis data and the Q-axis data;

Viterbi-decoding the deinterleaved data and determining if the Viterbi-decoded data is synchronized;

shifting by a predetermined interval the data deinterleaving sync position during said deinterleaving step when the Viterbi-decoded data is not synchronized; and exchanging the I-axis data and the Q-axis data with each other when it is determined that the Viterbi-decoded data is not synchronized for a predetermined number of times.

2. A method for restoring multi level/phase modulation data according to claim 1, wherein said step of exchanging the I-axis data and the Q-axis data with each other comprises the steps of:

generating a predetermined out-of-sync signal if a sync condition is not detected by the result of Veterbi decoding;

counting the out-of-sync signals;

generating a control signal when the counted result is equal to the number of times the deinterleaving sync position is shifted for one cycle; and exchanging the axes of the I-axis data and Q-axis data with each other in response to generation of the control signal.

3. A method for restoring multi level/phase modulation data according to claim 2, wherein said step of exchanging the axes comprises the steps of:

selecting the I-axis data according to the control signal to supply the selected I-axis data so as to be supplied to the Q-axis transmission channel; and selecting the Q-axis data according to the control signal to supply the selected Q-axis data so as to be supplied to the I-axis transmission channel.

4. A method for restoring multi level/phase modulation data according to claim 3, wherein said step of switching the I-axis to the Q-axis comprises the step of inverting the I-axis data and converting the inverted data into the Q-axis data.

5. An apparatus for receiving multi level/phase modulation data and restoring the multi level/phase modulation data into original data, said apparatus comprising:

input ports for receiving I-axis data and Q-axis data which is obtained by demodulating the received multi level/phase modulation data, respectively;

an axis exchanger portion connected to said input ports for receiving the I-axis data, the Q-axis data and a predetermined control signal and selectively exchanging the axes of the I-axis data and the Q-axis data according to said control signal;

deinterleaver means for deinterleaving the I-axis data and the Q-axis data which is outputted from the axis exchanger, respectively;

a Viterbi-decoding portion for decoding the deinterleaved data according to a Viterbi algorithm and outputting a predetermined out-of-sync signal when it is determined that the Viterbi-decoded data is synchronized as a result; and a sync detecting portion for detecting the out-of-sync signal outputted from the Viterbi-decoding portion to supply a sync adjustment control signal for shifting a data deinterleaving sync position to the deinterleaver and to supply said control signal for controlling axis exchange to the axis exchanger.

6. An apparatus for receiving multi level/phase modulation data according to claim 5, wherein said deinterleaver means comprises a first deinterleaver for deinterleaving the input data and outputting the deinterleaved data as the I-axis data; and a second deinterleaver for deinterleaving the input data and outputting the deinterleaved data as the Q-axis data.

7. An apparatus for receiving multi level/phase modulation data according to claim 5, wherein said axis exchanger portion comprises:

a first switch of which the input port is connected to an I-axis data input terminal, a first output terminal is an input port of said first deinterleaver, and a second output terminal is connected to an input port of said second deinterleaver via an inverter; and a second switch SW2 of which the input port is connected to an Q-axis data input terminal, a first output terminal is the other input port of said second deinterleaver, and a second output terminal is connected to the other input port of said first deinterleaver.

8. An apparatus for receiving multi level/phase modulation data according to claim 6, wherein said axis exchanger portion comprises:

a first switch of which the input port is connected to an I-axis data input terminal, a first output terminal is an input port of said first deinterleaver, and a second output terminal is connected to an input port of said second deinterleaver via an inverter; and a second switch SW2 of which the input port is connected to an Q-axis data input terminal, a first output terminal is the other input port of said second deinterleaver, and a second output terminal is connected to the other input port of said first deinterleaver.

9. An apparatus for receiving multi level/phase modulation data according to claim 5, wherein said sync detector comprises:

a counter for receiving an out-of-sync signal supplied from said Viterbi decoder as clock and performing a counting; and means for generating said control signal for said axis exchanger when the counted result of said counter reaches a value of a predetermined modulo-N.

10. An apparatus for receiving multi level/phase modulation data according to claim 8, wherein said modulo-N value of said counter is equal to the number of times which is continuously performing for one cycle when the deinterleaving sync is shifted according to said sync adjustment control signal in said deinterleaver.

* * * * *